United States Patent [19]
Otake

[11] Patent Number: 5,795,016
[45] Date of Patent: Aug. 18, 1998

[54] AUTOMOTIVE SLIDE ROOF SYSTEM

[75] Inventor: Joji Otake, Tochigi-ken, Japan

[73] Assignee: Yachiyo Kogyo Kabushiki Kaisha, Tokyo, Japan

[21] Appl. No.: 709,347

[22] Filed: Sep. 6, 1996

[51] Int. Cl.⁶ .................................................. B60J 7/053
[52] U.S. Cl. ........................................ 296/223; 296/222
[58] Field of Search ........................... 296/216, 221–224

[56] References Cited

U.S. PATENT DOCUMENTS

| | | | |
|---|---|---|---|
| 4,893,869 | 1/1990 | Fuerst | 296/220 |
| 5,026,113 | 6/1991 | DiCarlo et al. | 296/223 X |
| 5,527,085 | 6/1996 | Ochiai et al. | 296/223 |

FOREIGN PATENT DOCUMENTS

| | | |
|---|---|---|
| 5-319100 | 12/1990 | Japan |
| 5-270268 | 10/1993 | Japan |

*Primary Examiner*—Dennis H. Pedder
*Attorney, Agent, or Firm*—Skjerven Morrill MacPherson Franklin & Friel; Thomas S. MacDonald

[57] ABSTRACT

The rear end of the slide panel is lifted by a link member having a rear end with a pivotally attached to the slide panel, and a front end which is guided for horizontal movement. By receiving a pin laterally extending from an intermediate part of the link member in two specially shaped cam slots which are provided in a fixed cam slot member and a moveable cam member, respectively, it is possible to simplify the lifting mechanism while minimizing the play of the slide panel during its sliding movement. This arrangement at the same time reduces the number of required component parts, and allows the mechanism to be simplified.

7 Claims, 8 Drawing Sheets

5,795,016

1

AUTOMOTIVE SLIDE ROOF SYSTEM

TECHNICAL FIELD

The present invention relates to an automotive slide roof system in which an opening provided in a fixed roof panel can be selectively closed by a slide panel.

BACKGROUND OF THE INVENTION

An automotive slide roof system typically comprises an opening provided in a fixed roof panel, a moveable slide panel which is guided to move in the fore-and-aft direction to selective close and open the opening, and a power unit which moves the moveable slide panel in the desired direction. In such a slide roof system, it is required that the slide panel and the fixed roof panel define a continuous smooth surface and that a highly water tight sealing is achieved in the fully closed state of the system. Therefore, it is essential to be able to move the slide panel into and out of the fully closed state without causing any interference or excessive friction between the slide panel and the fixed roof panel.

Typically, the slide panel is closely fitted into the opening in its fully close state, and is moved downward out of this close fit by a lifting mechanism before it is slid open rearward. According to the slide roof system disclosed in Japanese patent laid-open publication No. 5-270268, a hook 12 formed in a tiltable link 11 of the lifting mechanism is adapted to engage an engagement piece 10 provided in a movable cam 9 as the slide panel is lowered by the lifting mechanism so that the play of the slide panel in the fore-and-aft direction during its sliding movement can be minimized.

Japanese patent laid-open publication No. 5-319100 discloses a similar slide roof system. A front lifting mechanism 7F is provided between a slide panel 3 and a front slider 6F, and a rear lifting mechanism 7R is provided between a slide panel 3 and a rear slider 6R. The operation of the front lifting mechanism 7F is effected by a series of pin and cam slot arrangements. A pin 36 of the front slider F is received in a cam slot 40 provided in a timing member 38, and a pin 42 of the timing member 38 is in turn received in a cam slot 43 of a longitudinally extending follower member 8. Yet another pin and cam slot arrangement is provided in a front end of the follower member to effect the vertical movement of the front end of the slide panel.

The former prior invention is relatively ineffective in reducing the play of the slide panel during its sliding movement. The latter prior invention has the disadvantage of requiring highly complex pin and cam slot arrangements.

BRIEF SUMMARY OF THE INVENTION

In view of such problems of the prior art, a primary object of the present invention is to provide an automotive slide roof system which can move the slide panel substantially without any play.

A second object of the present invention is to provide an automotive slide roof system which is simple in structure, and is therefore economical to manufacture.

A third object of the present invention is to provide an automotive slide roof system which is simple in structure, and is therefore reliable in use.

According to the present invention, these and other objects can be accomplished by providing an automotive slide roof system for selectively closing an opening provided in a fixed roof of a vehicle, comprising: a pair of guide rails fixedly secured to a vehicle body, and extending along either

2 side of the opening; front and rear sliders guided by said guide rails and supporting a slide panel for movement along a fore-and-aft direction of the vehicle; and a lifting mechanism provided between each of the rear sliders and the slide panel for moving a rear part of the slide panel vertically with a drive force applied thereto by a push-pull cable; the lifting mechanism comprising: a moveable cam slot member securely attached to the rear slider and provided with a first cam slot; a fixed cam slot member securely attached to the guide rail and provided with a second cam slot; and a link member having a rear end pivotally attached to the slide panel, a forward end slidably received in a horizontal slot formed in the moveable cam slot member, and an intermediate part having an engagement pin received in both the first and second guide slots; the rear end of the second cam slot being provided with an open end for allowing the engagement pin to move out of the second cam slot as the link member along with the slide panel moves further rearward.

As the slide panel is lowered from its fully closed position, the link member which is pivotally attached to the slide panel can be continually and positively constrained by the two cam slots so that the link member along with the slide panel can be guided substantially without any play. When the slide panel is being moved horizontally after it has been fully lowered, the link member along with the slide panel can be constrained in the vertical direction by the guide slot and in the horizontal direction by the first cam slot of the moveable cam slot member so that the link member along with the slide panel can be guided to its fully open position substantially without any play.

To ensure that the link member is positively constrained at all times, the first and second cam slots should always define a non-zero angle relative to each other. In particular, if the first cam slot includes a substantially vertical forward section and a substantially horizontal rear section which are smoothly connected with each other, and the second cam slot includes a substantially vertical forward section and a substantially horizontal rear section which are smoothly connected with each other, the desired movement of the slide panel can be achieved without producing any play throughout the entire movement of the slide panel.

To ensure smooth movement after the engagement pin of the link member has moved out of the second cam slot of the fixed cam slot member, the engagement pin may be provided with a roller which is adapted to be guided by a guide slot provided in the guide rail.

When opening the slide panel, it is necessary not only to lower the rear end of the slide panel but also to lower the front end of the slide panel. It could be achieved by using a tiltable link mechanism similar to that used for lowering the rear end of the slide panel, but a simpler structure is more desirable.

According to a preferred embodiment of the present invention, a front cam slot is provided in a front end of the guide rail for guiding the front slider, the front cam slot being provided with a sloping section to move a front end of the slide panel downward as the slide panel along with the front slider is moved rearward.

Typically, the front cam slot member is made of a member separate from the guide rail, and it is difficult to totally eliminate a discontinuity between the front cam slot and the guide slot, such as a step or a gap between them. To eliminate any noise or impact as the front slider moves between the front cam slot and the guide slot, the front cam slot may be provided with a narrow part and a broad part which are defined along the front cam slot, the narrow part extending further rearward than the broad part and being provided with a flared rear end, the front slider being provided with a small diameter portion and a large diameter portion which are slidably received in the narrow part and the broad part, respectively. Thus, even when some discontinuity may be present between the front cam slot and the guide slot, the flared section of the front cam slot allows the front slider to move between the front cam slot and the guide slot in a highly smooth fashion.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
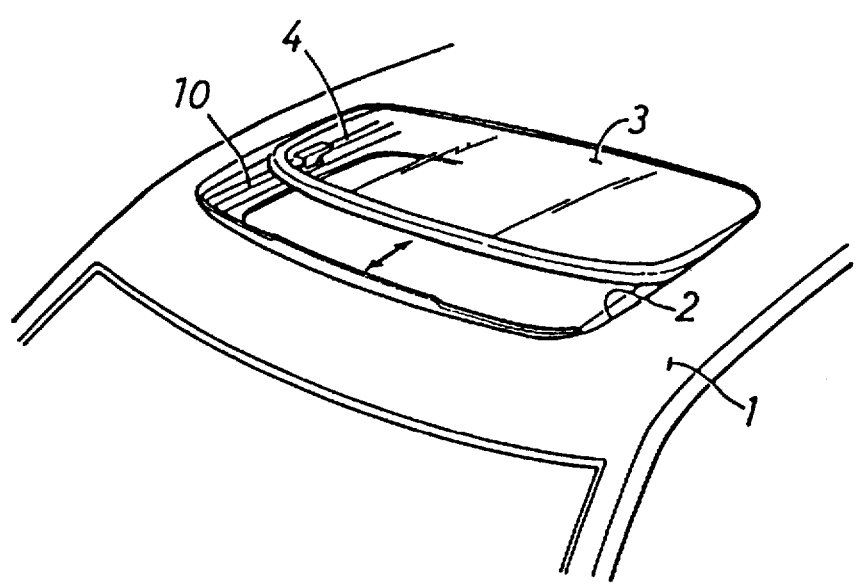
FIG. 1 is an external perspective view of an embodiment of the automotive slide roof system according to the present invention.

FIG. 1 shows a general view of an embodiment of the automotive slide roof system according to the present invention. A slightly laterally elongated rectangular opening 2 is formed in a fixed roof panel 1 of a motor vehicle, and is adapted to be selectively closed by a moveable roof panel or a slide panel 3, typically made of a sheet of glass, which is actuated by a geared electric motor via a push-pull cable. The slide roof system according to the present invention is normally symmetric about a longitudinal center line extending along the fore-and-aft direction, and the following description is therefore directed only to one side of the system unless otherwise specified.

Figure 5:
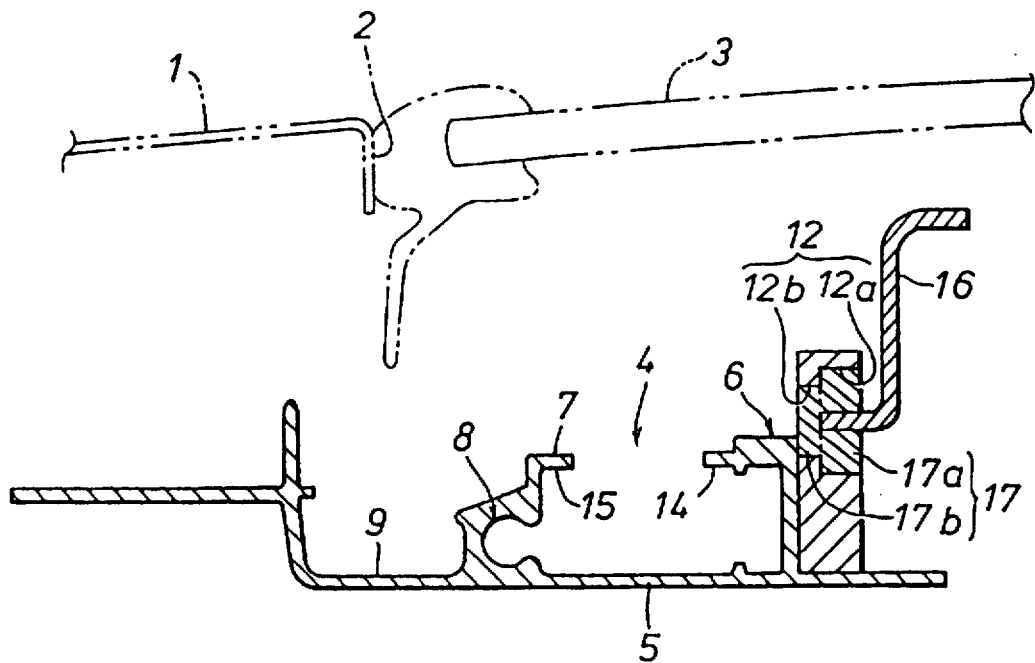
FIG. 5 is a sectional view taken along line V—V of FIG. 3.
Figure 6:
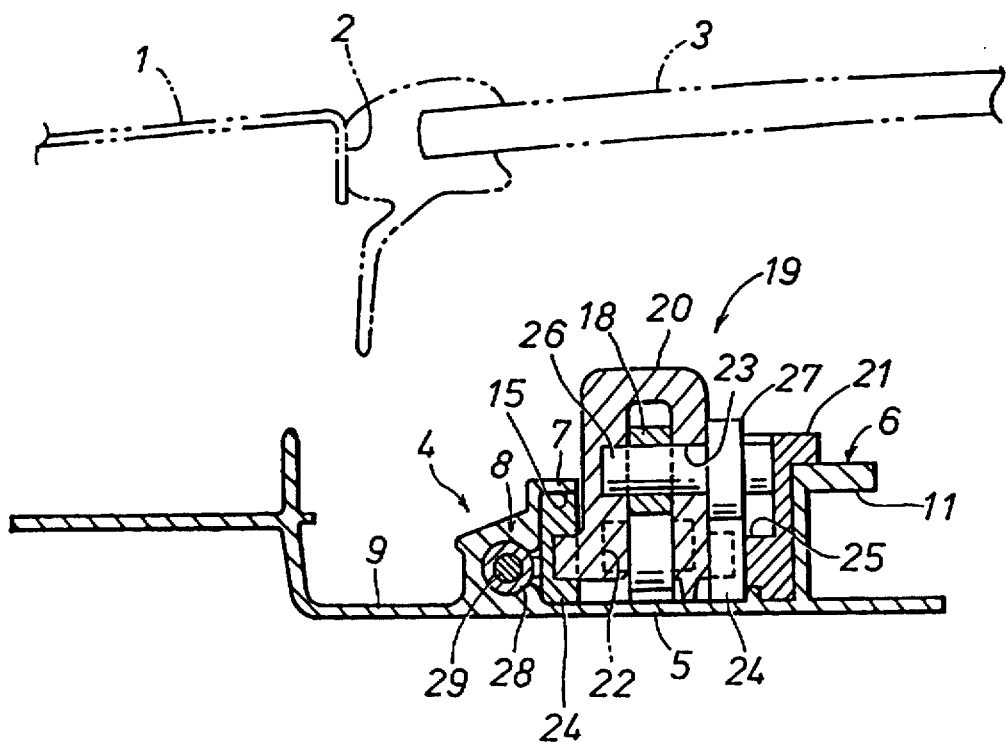
FIG. 6 is a sectional view taken along line VI—VI of FIG. 3.
Figure 7:
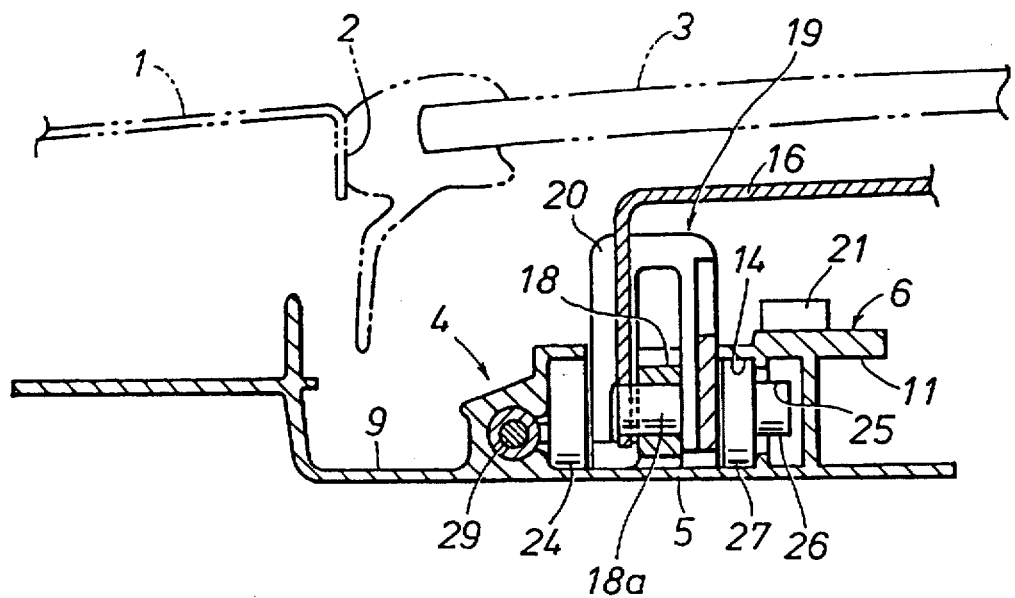
FIG. 7 is a sectional view taken along line VII—VII of FIG. 4.

A pair of guide rails 4 made of extruded aluminum alloy extend along either side of the opening 2. As best illustrated in FIGS. 5 and 6, each guide rail 4 comprises a flat base portion 5, a T-shaped portion 6 which projects upright from a laterally inner end portion of the base portion 5, a C-shaped portion 8 which projects upright from a laterally outer end portion of the base portion 5 and includes an inwardly directed flange 7 formed at an upper end thereof, and a gutter portion 9 formed along the outer face of the C-shaped portion 8. The guide rail 4 is fixedly secured to a stiffener member 10 (FIG. 3) which is in turn secured to the inner surface of the fixed roof panel 1.

Figure 2:
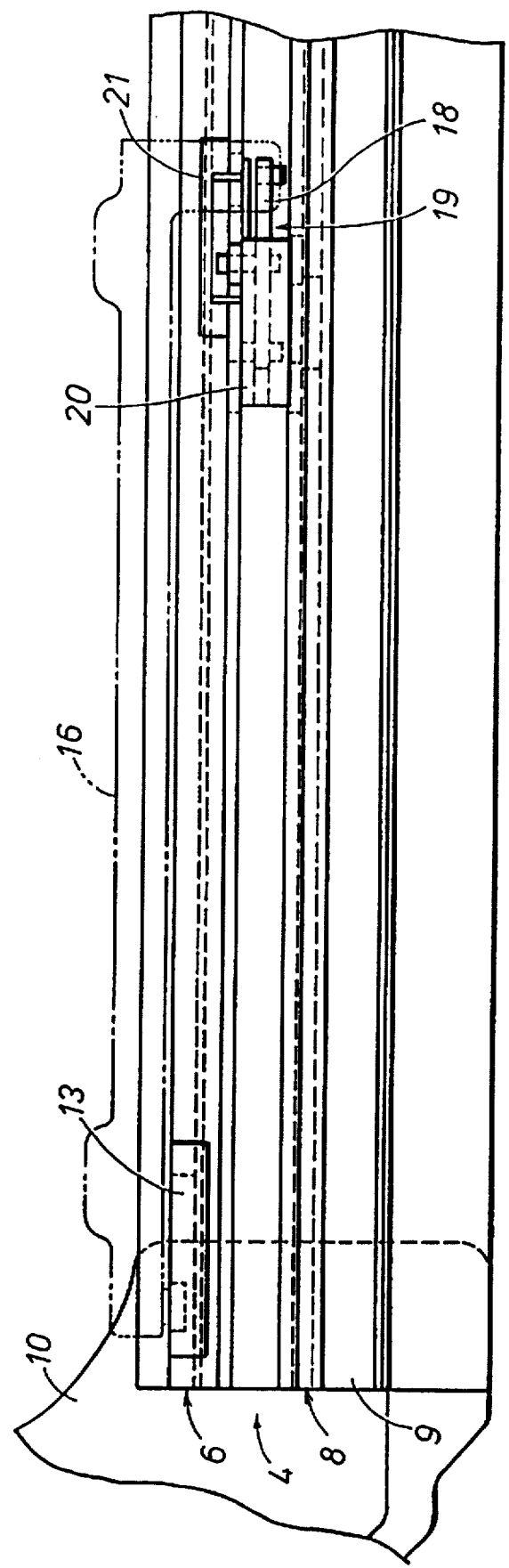
FIG. 2 is a fragmentary plan view of a left hand side part of the automotive slide roof system according to the present invention.
Figure 3:
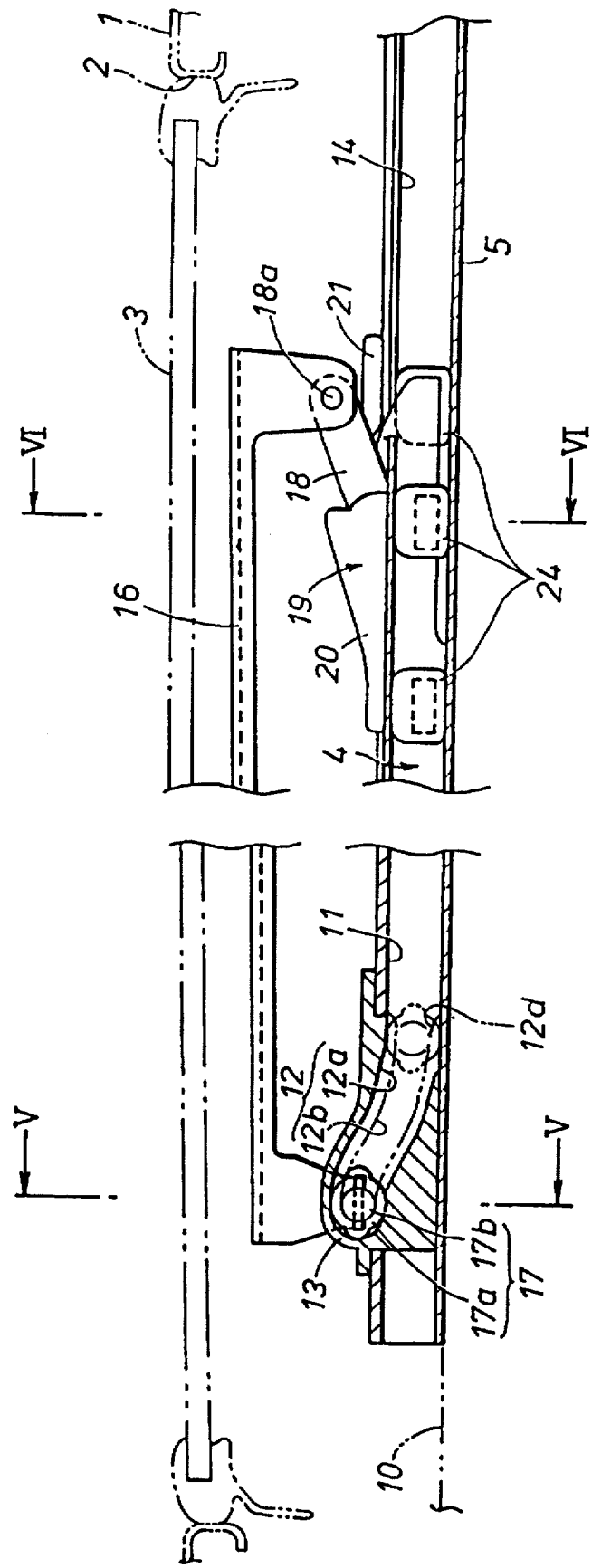
FIG. 3 is a fragmentary side view of a right hand side part of the automotive slide roof system according to the present invention when the slide panel is fully closed.
Figure 4:
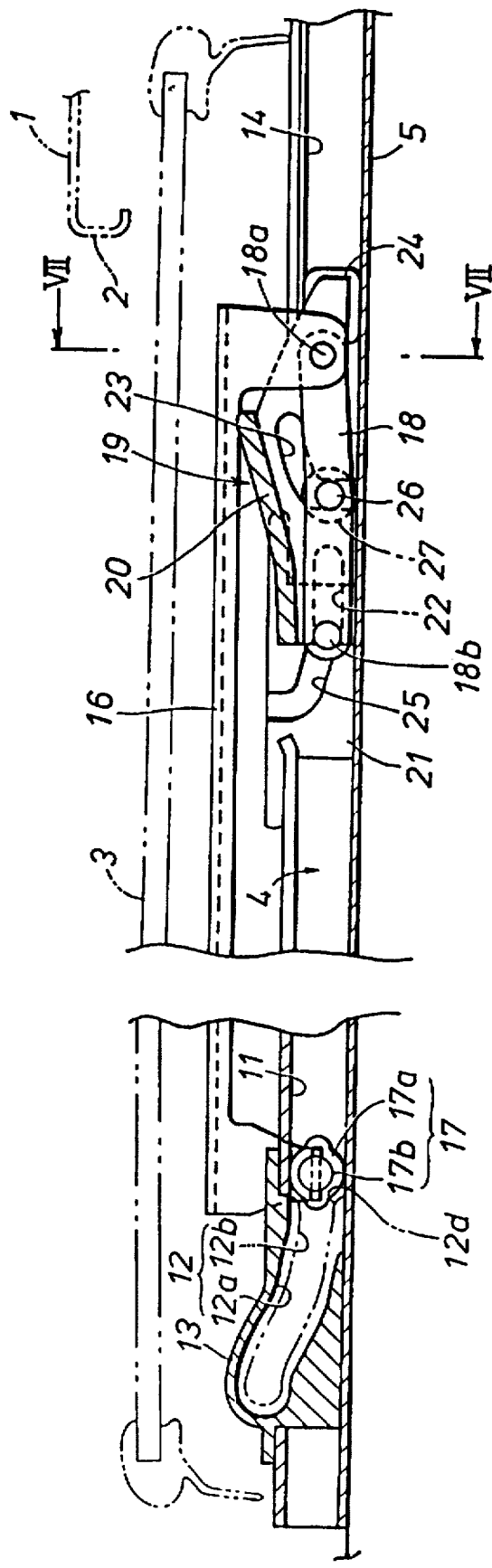
FIG. 4 is a view similar to FIG. 3 showing the state when the slide panel is at its lift-down position.

Referring to FIG. 6, a first guide slot 11 is defined between the inwardly directed upper end of the T-shaped portion 6 and the upper surface of the base portion 5 of the guide rail 4. As illustrated in FIGS. 2 to 4, to the forward end of the guide rail 4 is fixedly secured a front cam slot member 13 which defines a front cam slot 12 smoothly connected to the guide slot 11 and sloping upward toward the front end thereof. A second guide slot 14 is defined between the outwardly directed upper end of the T-shaped portion 6 and the upper surface of the base portion 5 of the guide rail 4 (see FIG. 5). A third guide slot 15 is defined between the inwardly directed flange 7 of the C-shaped portion 8 and the upper surface of the base portion 5 of the guide rail 4. The gutter portion 9 serves as a channel for letting water out.

A pair of stays 16 are fixedly secured to the inner surface of the slide panel 3 along either side edge thereof. A front slider 17 is attached to a front end of each stay 16 to slidably engage with the first guide slot 11, and an end 18a of a link member 18 forming a part of a lifting mechanism 19 (which is described hereinafter) is pivotally attached to a rear end of the stay 16.

The lifting mechanism 19 comprises a moveable cam slot member 20 which can move in the fore and aft direction guided by the second guide slot 14 and the third guide slot 15, a fixed cam slot member 21 which is fixedly secured to a prescribed location on the guide rail 4, and the aforementioned link member 18. A pin 18b secured to the other end of the link member 18 is engaged by a horizontally elongated slot 22 formed in the moveable cam slot member 20. The moveable cam slot member 20 is further provided with a first cam slot 23 which extends vertically from the bottom surface of the cam slot member and gradually curves towards the rear as it further extends upward, and a plurality of rear sliders 24 which slidably engage with the second guide slot 14 and the third guide slot 15.

The fixed cam slot member 21 is provided with a second cam slot 25 which extends downward from an upper surface of the cam slot member, and gradually curves towards the rear as it further extends downward. The rear end of this second cam slot 25 of the fixed cam slot member 21 is continually connected to the second guide slot 14 of the guide rail 4.

A longitudinally intermediate part of the link 18 is provided with an engagement pin 26 which extends laterally in both directions. The two outer ends of the engagement pin 26 are engaged in the first and second cam slots 23 and 25 of the moveable cam slot member 20 and the fixed cam slot member 21, respectively. The engagement pin 26 may consist of a simple rod member, but may be more preferably provided with a cam follower 27 consisting of a freely rotatable roller which can smoothly roll along the guide slot 14 as the slide panel 3 is slid rearward.

A central bore of the C-shaped portion 8 receives a projection 28 extending laterally from the outer side of the moveable cam slot member 20 to engage an end of a push-pull cable 29 as well as the push-pull cable 29 itself. The push-pull cable 29 can be pushed and pulled by a geared motor not shown in the drawing to move the moveable cam slot member 20 in the fore-and-aft direction.

Figure 8:
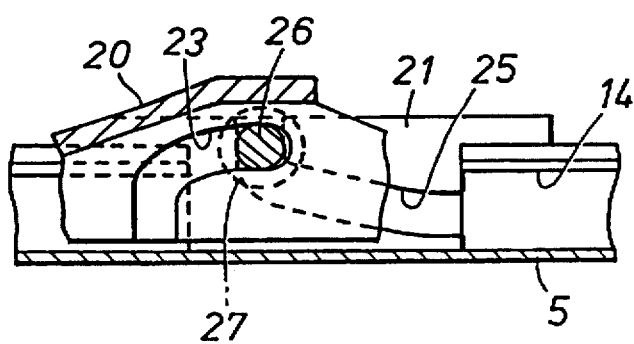
FIG. 8 is a fragmentary side view of an essential part of the lifting mechanism at its fully lifted state.
Figure 9:
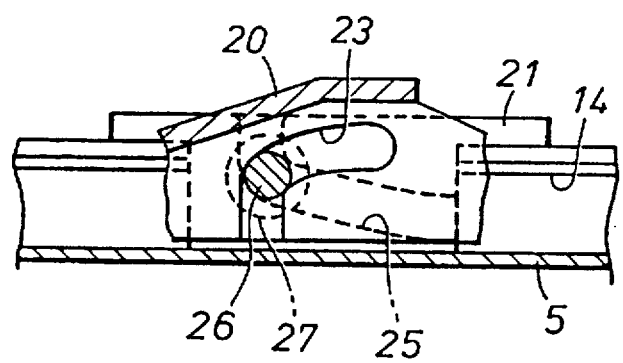
FIG. 9 is a view similar to FIG. 8 showing the lifting mechanism at its intermediate state.
Figure 10:
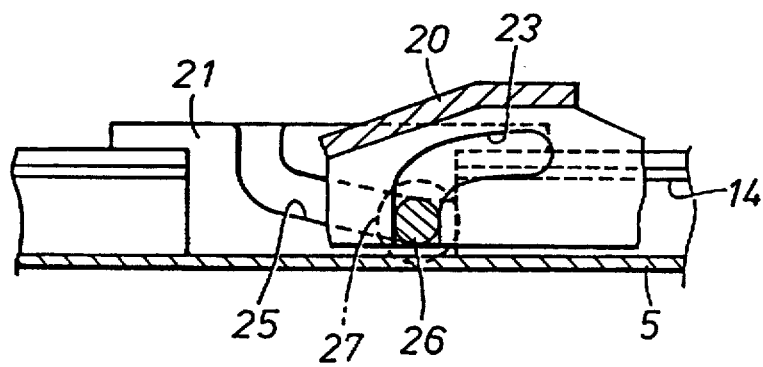
FIG. 10 is a view similar to FIG. 8 showing the lifting mechanism at its fully lowered state.

The mode of operation of this embodiment is described in the following with further reference to FIGS. 8 to 10. First of all, as the slide panel 3 moves from its fully closed state (FIGS. 3 and 8) to a lift-down state (FIG. 10), the engagement pin 26 continues to be guided by both the first cam slot 23 of the moveable cam slot member 20 and the second cam slot 25 of the fixed cam slot member 21. Therefore, the link member 18, which was initially inclined with its rear end up (FIG. 3), can tilt into a substantially horizontal position substantially without any play positively guided by these cam slots 23 and 25. More specifically, a curved section of the first cam slot 23 pushes the engagement pin 26 down, and this movement is accommodated by a vertical section of the second cam slot 25. During this tilting movement of the link member 18, the front end of the link member 18 is restricted from any vertical movement by the pin 18b which is secured to the forward end of the link member 18 and engaged by the horizontally elongated slot 22 of the moveable cam slot member 20. As a result, the slide panel 3 can tilt with its rear end moving downward around the front slider 17.

By the time the link member 18 is thus placed horizontally (FIG. 4), the engagement pin 26 has moved to an inlet end of the second guide slot 14 while engaged by the vertical section of the cam slot 23 of the moveable cam slot member 20 against a fore-and-aft movement. Therefore, as the push-pull cable 29 is pulled further, the front slider 17 moves downward along the front cam slot 12 connected to the front end of the first guide slot 11 while the engagement pin 26 proceeds into the second guide slot 14 so that the front end of the slide panel 3 is lowered as it moves rearward. At this point, the moveable cam slot member 20 is prevented from moving vertically because the sliders 24 are engaged in the second and third guide slots 14 and 15, and is also prevented from moving horizontally because the engagement pin 26 of the link member 18 is engaged in the vertical section of the first cam slot 23 of the moveable cam slot member 20. As a result, a high level of rigidity can be achieved in the connection between the movable cam slot member 20 which is actuated by the push-pull cable 29 and the link member 18, and this ensures a smooth sliding movement of the slide panel 3. Furthermore, because the engagement pin 26 is provided with the roller 27 which is closely guided by the second guide slot 14 formed in the guide rail 4, the engagement pin 26 along with the link member 18 can move rearward substantially free from play.

When the push-pull cable 29 is pushed, the movement of the slide panel 3 is reversed, or the slide panel 3 is lifted as it reaches the forward end of its horizontal movement to fully close the opening 2 in the fixed roof panel 1. When the slide panel 3 is fully closed, the moveable cam slot member 20 is prevented from moving vertically because the sliders 24 are engaged in the second and third guide slots 14 and 15, and is also prevented from moving horizontally because the engagement pin 26 of the link member 18 is engaged in the vertical section of the second cam slot 25 of the fixed cam slot member 21. Optionally, one of the rear sliders 24 may be engaged in the first guide slot 11. Thus, the slide panel 3 can be kept free from play also when it is fully closed.

Figure 11:
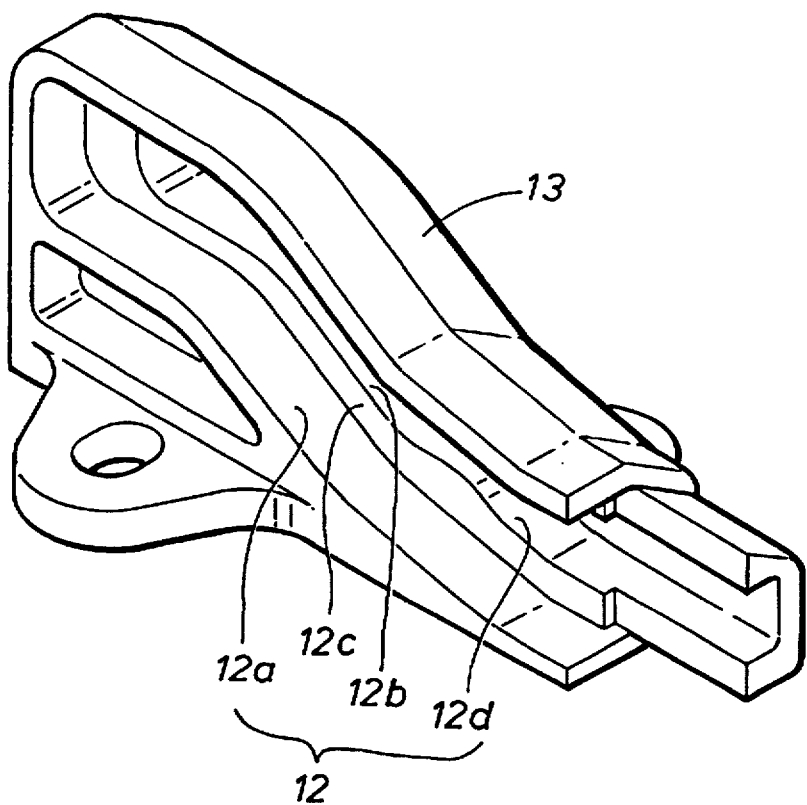
FIG. 11 is a perspective view showing the front cam member.

As illustrated in FIGS. 3 to 5, the front cam slot 12 connected to the front end of the first guide slot 11 consists of a broad part 12a defined along the inner side of the front cam slot 12 and a narrow part 12b defined along the outer side of the front cam slot 12. As illustrated in FIG. 11, the front cam slot member 13 may be made of cast aluminum alloy, and a pair of shoulders 12c facing inward are defined between the broad part 12a and the narrow part 12b of the front cam slot 12. The front slider 17 comprises a large diameter portion 17a which is adapted to be engaged by the broad part 12a of the front cam slot 12, and a small diameter portion 17b which is adapted to be engaged by the narrow part 12b of the front cam slot 12.

When the slide panel 3 is fully closed, the large diameter portion 17a is received in the broad part 12a of the front cam slot 12, and the small diameter portion 17b is received in the narrow part 12b of the front cam slot 12. The small diameter portion 17b extends further rearward than the large diameter portion 17a, and the rear end of the small diameter portion 17b is flared as indicated by 17d in FIGS. 3, 4 and 11. As the slide panel 3 is opened from the fully closed state, the large diameter portion 17a of the front slider 17 moves on from the broad part 12a of the front cam slot 12 to the first guide slot 11. However, the small diameter portion 17b still continues to be received in the narrow part 12b of the front cam slot 12 as indicated by the imaginary lines in FIG. 3. Because the small diameter portion 17b is flared at its rear end, even when the connection between the front cam slot 12 and the first guide slot 11 involves a stepped discontinuity, the front slider 17 can move on smoothly from the front cam slot 12 to the first guide slot 11. Conversely, when the slide panel 3 is about to be fully closed, the small diameter portion 17b is received in the narrow part 12b of the front cam slot 12 before the large diameter portion 17a is received in the broad part 12a of the front cam slot 12, and the front slider 17 can again move on smoothly from the first guide slot 11 to the front cam slot 12.

This arrangement can be also applied to a part of connection between the cam slot provided in a rear part of the guide rail and a support member, such as the part of engagement between the second cam slot 25 of the fixed cam slot member 21 and the engagement pin 26.

Thus, according to the present invention, by receiving a pin laterally extending from a link member for lifting a rear part of the slide panel in two specially shaped cam slots which are provided in a fixed cam slot member and a moveable cam member, respectively, it is possible to simplify the lifting mechanism while minimizing the play of the slide panel during its sliding movement. This arrangement at the same time reduces the number of required component parts, and allows the mechanism to be simplified. Thereby, the manufacturing cost of the slide roof system can be reduced, and the reliability of the lifting mechanism during use can be maximized.

Although the present invention has been described in terms of a specific embodiment thereof, it is possible to modify and alter details thereof without departing from the spirit of the present invention.

What we claim is:

1. An automotive slide roof system for selectively closing an opening provided in a fixed roof of a vehicle, comprising:

a pair of guide rails fixedly secured to a vehicle body, and extending along either side of said opening;

front and rear sliders guided by said guide rails and supporting a slide panel for movement along a fore-and-aft direction of said vehicle; and a lifting mechanism provided between each of said rear sliders and said slide panel for moving a rear part of said slide panel vertically with a drive force applied thereto by a push-pull cable;

said lifting mechanism comprising:

a moveable cam slot member securely attached to said rear slider and provided with a first cam slot;

a fixed cam slot member securely attached to said guide rail and provided with a second cam slot; and a link member having a rear end pivotally attached to said slide panel, a forward end slidably received in a horizontal slot formed in said moveable cam slot member, and an intermediate part having an engagement pin received in both said first and second guide slots;

a rear end of said second cam slot being provided with an open end for allowing said engagement pin to move out of said second cam slot as said link member along with said slide panel moves further rearward.

2. An automotive slide roof system according to claim 1, wherein said first and second cam slots always define a non-zero angle relative to each other at said engagement pin such that said link member is positively constrained and the moving of the slide panel is without play.

3. An automotive slide roof system according to claim 1, wherein said first cam slot includes a substantially vertical forward section and a substantially horizontal rear section which are smoothly connected with each other, and said second cam slot includes a substantially vertical forward section and a substantially horizontal rear section which are smoothly connected with each other.

4. An automotive slide roof system according to claim 1, wherein said engagement pin is provided with a cam follower which is adapted to be guided by a guide slot provided in said guide rail.

5. An automotive slide roof system according to claim 1, wherein a front cam slot is provided in a front end of said guide rail for guiding said front slider, said front cam slot being provided with a sloping section to move a front end of said slide panel downward as said slide panel along with said front slider is moved rearward.

6. An automotive slide roof system according to claim 5, wherein said front cam slot is formed in a front cam slot member which is separate from said guide rail, and is provided with a narrow part and a broad part which are defined along said front cam slot, said narrow part extending further rearward than said broad part and being provided with a flared rear end, said front slider being provided with a small diameter portion and a large diameter portion which are slidably received in said narrow part and said broad part, respectively.

7. An automotive slide roof system according to claim 4 wherein said cam follower is a freely rotatable roller provided on said engagement pin.

* * * * *